Patented June 2, 1931

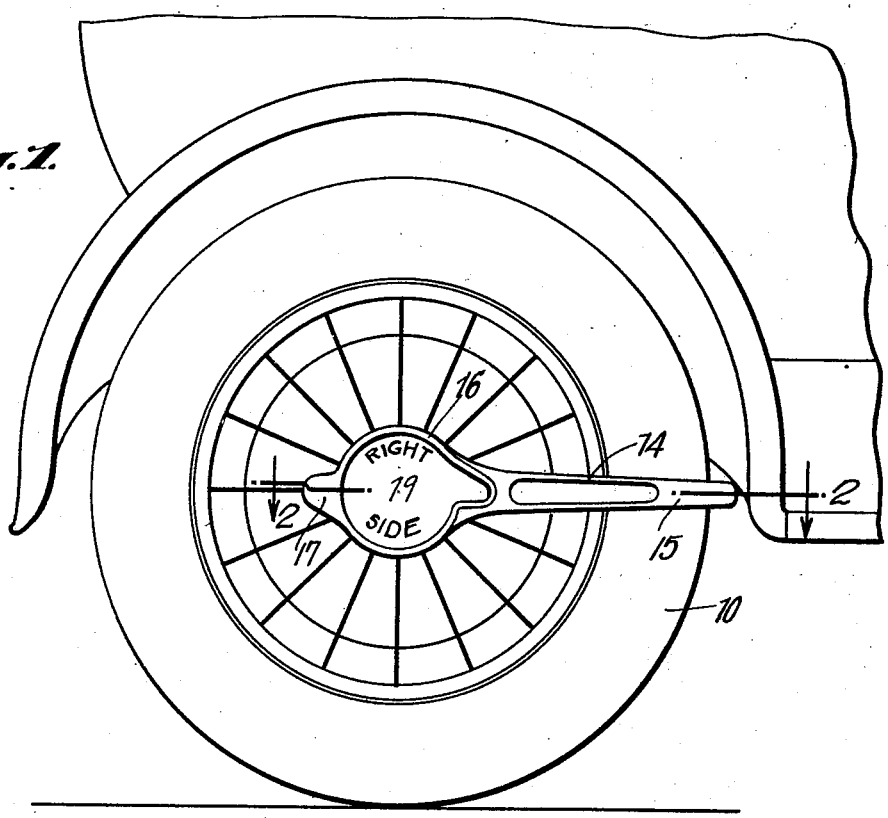
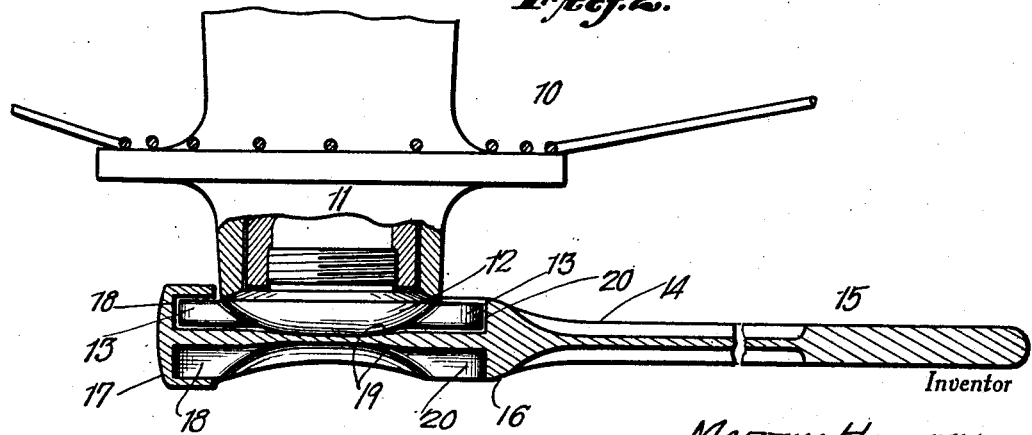

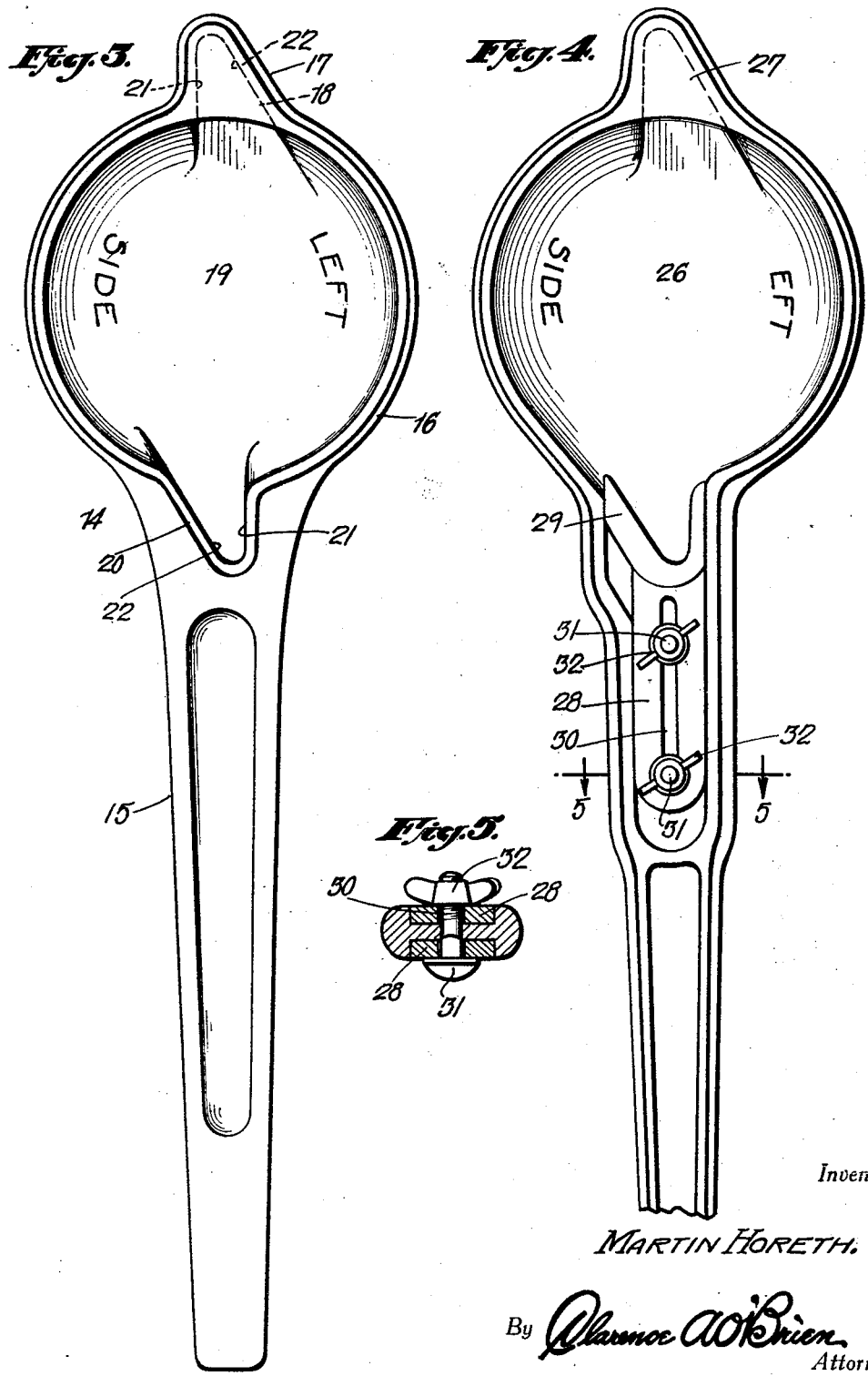

1,808,462

UNITED STATES PATENT OFFICE

MARTIN HORETH, OF BROOKLYN, NEW YORK

HUB CAP WRENCH

Application filed July 27, 1929. Serial No. 381,552.

This invention relates to improvements in hub cap wrenches for automobiles.

The primary object of the invention resides in a wrench especially designed for applying and removing the right and left hub caps on automobile wheels of the wire spoke type without damaging or marring the same, it being appreciated that this type of hub cap embodies opposed lugs which at present receive hammer blows to tightly apply the cap or for loosening the same for removal, resulting in the breaking of the lugs or damage thereto.

Another object of the invention is to provide a hub cap wrench embodying a handle provided with a head at one end thereof, the opposed side faces of which are concaved and which communicate with reversely disposed sockets for receiving the lugs of the hub cap of the respective right and left wheels of an automobile.

With these and other objects in view, the invention resides in the novel construction, combination and arrangement of parts, the essential features of which will be hereinafter more fully described, and pointed out in the appended claims and illustrated in the accompanying drawings, in which:

Figure 1 is a side elevational view of an automobile wheel showing my improved wrench in position thereon.

Figure 2 is a transverse sectional view on the line 2—2 of Figure 1.

Figure 3 is an enlarged side elevational view of the wrench.

Figure 4 is a side elevational view of a slightly modified form.

Figure 5 is a detail horizontal sectional view on the line 5—5 of Figure 4.

Referring more particularly to the drawings, the numeral 10 designates an automobile wheel of the wire spoke type which includes the usual hub 11 to which the hub cap 12 is threaded, the head of the cap being dome shaped or convex and provided with opposed offset lugs 13. My improved hub cap wrench 14 is shown applied to the hub cap 12 of this particular type of wheel and includes an elongated handle member 15 which is provided at one end with an enlarged circular shaped head 16, the opposed sides of which are concaved to receive the convex heads of the hub caps 12 of both the right and left wheels of an automobile.

Both sides of the head being identical, a description of one will suffice for the other. Extending beyond the periphery of the head 16 is a nose 17 provided with a substantially V-shaped socket 18, which socket opens into the concavity 19 in the side face of the head. The socket 18 constitutes a closed socket, while directly opposite from the same is an open substantially V-shaped socket 20, both of the sockets 18 and 20 being provided with a wall 21 which is substantially parallel to the longitudinal axis of the handle member together with an inclined angular wall 22. The walls 21 are out of axial alinement with each other to respectively receive the offset toothed shaped spanner lug 13 of the hub cap 12. The walls of the sockets 18 and 20 on one side of the head are directly opposite to the walls of the sockets on the opposite side in order that one side of the wrench may be used in connection with the left wheel hub, and when reversed, the other side of the wrench may be applied to the hub of the right wheel of an automobile.

In use, it will be seen that the wrench may be applied to the hub cap 12 so that one of the spanner lugs 13 seats in the closed socket 18 and the opposite lug seated in the open socket 20 as clearly shown in Figures 2 and 3 of the drawings. When the wrench is in position, the convex head of the cap snugly fits in the concavity in the head of the wrench and upon applying pressure to the outer end of the handle member, great leverage may be had sufficient to tightly screw the hub cap in position upon the hub of a wheel, or loosen the hub cap from a tightened position. It will be appreciated that hub caps of the type herein described are highly polished and are easily marred, but by the use of my wrench, the same may be applied or removed without marring or scratching of the cap.

In Figures 4 and 5 of the drawings I have shown a slightly modified form of my invention in which the numeral 24 designates an elongated handle having an enlarged head 25 at one end thereof, the opposite sides of which are concaved as at 26. A closed socket 27 similar to the socket 18 is provided in this form and opens into the concavity 26 for the same purpose as hereinbefore mentioned. The handle member 24 is provided with elongated recesses 27' on opposite sides thereof for slidably receiving the shanks 28 of adjustable socket member 29. The shanks 28 and the socket members are provided with elongated slots 30 for the passage of bolts 31 which receive clamping thumb nut 32. It will be understood that by loosening the thumb nuts 32, the movable socket 29 may be adjusted relative to the closed socket 27 to accommodate hub caps of various sizes, it being appreciated that the size of the hub caps on the various makes of cars differs but by adjusting the socket 29, the wrench may be made to accommodate the different size hub caps.

While I have shown what I deem to be the most desirable embodiment of my invention, it will be understood that many of the details may be varied if desired, and I therefore do not wish to limit myself to the exact details of construction shown, nor to anything less than the whole of my invention, limited only by the appended claims.

Having thus described the invention, what I claim as new and desire to secure by Letters Patent is:—

1. A hub cap wrench comprising a handle, a flat head extending longitudinally at one end of said handle and having a cavity in the side thereof, a closed socket communicating with the cavity and an open socket provided in said head communicating with the cavity and open on its outer side, the open and closed sockets being diametrically opposed to receive the opposite lugs of a hub cap, said open socket extending into the handle.

2. A hub cap wrench of the character described comprising an elongated handle having a longitudinally extending recess in one end portion thereof and at one side, a longitudinally extending flat head formed integral on one end of the handle having a cavity in one side thereof communicating with the recess in the handle, an integral nose on the head diametrically opposite the handle and having a socket therein communicating with the cavity in the head, an adjustable socket member mounted for longitudinal sliding movement in the recess in the handle and having its socket communicating with the cavity in the head in opposed relation to the first named socket and means for securing said member in adjusted position.

3. A hub cap wrench comprising an elongated handle, a relatively flat head extending longitudinally at one end of said handle and having a cavity in the side thereof of a shape to receive the particular type of hub cap to be applied or removed to a wheel, a closed socket communicating with said cavity and a diametrically opposed open socket provided in said head communicating with the cavity and open on the outer side to receive the opposed lug of a hub cap.

4. A hub cap wrench comprising a handle, an enlarged head extending longitudinally at one end of said handle and having a hub cap receiving opening therein, a closed socket in the wall of said opening, and an open socket in the wall of said opening diametrically opposite said closed socket for receiving the opposed lug of a hub cap.

In testimony whereof I affix my signature.

MARTIN HORETH.